(12) United States Patent
Won

(10) Patent No.: US 11,445,171 B2
(45) Date of Patent: Sep. 13, 2022

(54) DISPLAY APPARATUS AND METHOD OF CONTROLLING THE SAME

(71) Applicant: SAMSUNG ELECTRONICS CO., LTD., Suwon-si (KR)

(72) Inventor: Kang Young Won, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 46 days.

(21) Appl. No.: 16/760,233

(22) PCT Filed: Oct. 30, 2018

(86) PCT No.: PCT/KR2018/012997
§ 371 (c)(1),
(2) Date: Apr. 29, 2020

(87) PCT Pub. No.: WO2019/088646
PCT Pub. Date: May 9, 2019

(65) Prior Publication Data
US 2021/0211642 A1 Jul. 8, 2021

(30) Foreign Application Priority Data
Oct. 31, 2017 (KR) .......................... 10-2017-0143370

(51) Int. Cl.
*H04N 17/04* (2006.01)
*H04N 21/21* (2011.01)

(52) U.S. Cl.
CPC ........... *H04N 17/045* (2013.01); *H04N 21/21* (2013.01)

(58) Field of Classification Search
CPC .............................. H04N 21/21; H04N 17/045
See application file for complete search history.

(56) References Cited

U.S. PATENT DOCUMENTS

2016/0055778 A1* 2/2016 Kim .................... H04N 17/045
345/618
2017/0308370 A1 10/2017 Sung

FOREIGN PATENT DOCUMENTS

KR 10-2014-0085052 7/2014
KR 10-2016-0023418 3/2016
(Continued)

OTHER PUBLICATIONS

International Search Report for PCT/KR2018/012997, dated Feb. 28, 2019, 4 pages.
(Continued)

*Primary Examiner* — Nicholas T Corbo
(74) *Attorney, Agent, or Firm* — Nixon & Vanderhye, P.C.

(57) ABSTRACT

A display apparatus includes a display; a content receiver configured to receive image content; a communication interface configured to communicate with a service apparatus; a storage configured to store a setting value of factor related to an operation of the content receiver, the communication interface, and the display; and a controller configured to change the setting value of factor related to the operation of at least one of the content receiver, the communication interface, and the display, and to determine whether a risk of an operation error of at least one is caused due to the changed setting value. When it is determined that there is the at least one risk of the operation error due to the changed setting value, the controller is configured to transmit information about the factor and the operation error to a service apparatus through the communication interface.

14 Claims, 13 Drawing Sheets

(56) References Cited

FOREIGN PATENT DOCUMENTS

| | | |
|---|---|---|
| KR | 10-2016-0026202 | 3/2016 |
| KR | 10-2016-0129662 | 11/2016 |
| KR | 10-2017-0041998 | 4/2017 |

OTHER PUBLICATIONS

Written Opinion of the ISA for PCT/KR2018/012997, dated Feb. 28, 2019, 6 pages.
Notice of Preliminary Rejection dated Nov. 2, 2021 in counterpart Korean Application No. 10-2017-0143370 and English-language translation.
Office Action dated Apr. 20, 2022 in counterpart Korean Application No. 10-2017-0143370 and English-language translation.

* cited by examiner

DISPLAY APPARATUS AND METHOD OF CONTROLLING THE SAME

This application is the U.S. national phase of International Application No. PCT/KR2018/012997 filed 30 Oct. 2018, which designated the U.S. and claims priority to KR Patent Application No. 10-2017-0143370 filed 31 Oct. 2017, the entire contents of each of which are hereby incorporated by reference.

FIELD

The present disclosure relates to a display apparatus and a method of controlling the same, and more particularly, to a display apparatus capable of self-diagnosis, and a method of controlling the same.

DESCRIPTION OF RELATED ART

In the related art, display apparatuses refer to output apparatuses displaying visual information converted from acquired or stored image information to users and have been widely used in various application fields such as individual homes or places of business.

For example, the display apparatuses may be monitor devices connected to personal computers or server computers, portable computer devices, navigation devices, televisions (TVs), Internet Protocol televisions (IPTVs), portable terminals, such as smartphones, tablet personal computers (PCs), personal digital assistants (PDAs), or cellular phones, or various display apparatuses used to play advertisements or movies in the industrial field, or various types of audio/video systems.

The display apparatus may include various components therein, and may be connected to various external apparatuses. For example, a microprocessor, a memory, a display panel, and the like are provided in the display apparatus, and the display apparatus may be connected to an external image reproducing apparatus, an image providing server, or the like.

As such, various components and/or apparatuses may be connected inside or outside the display apparatus, and thus an error may occur in an interface to which the various components and/or apparatuses are connected.

In the related art, when the error occurs in the display apparatus, the display apparatus notifies a user of information related to the error only for a predefined error by a designer, and guides the user to directly take action.

However, according to a prior art, when the display apparatus does not operate normally, the display apparatus notifies the user of information related to an operation error, and thereby the user could not use the display apparatus until analysis and repair of the operation error were made.

SUMMARY

An aspect of the present disclosure is to provide a display apparatus capable of self-diagnosing an operation error inside the display apparatus and/or an operation error with an external apparatus, and a method of controlling the same.

Another aspect of the present disclosure is to provide a display apparatus capable of determining a risk of an operation error without stopping the operation, and a method of controlling the same.

Another aspect of the present disclosure is to provide a display apparatus capable of providing various services for resolving an error according to a result of determining a risk of error, and a method of controlling the same.

An aspect of the disclosure provides a display apparatus including: a display; a content receiver configured to receive image content; a communication interface configured to communicate with a service apparatus; a storage configured to store a setting value of factor related to an operation of the content receiver, the communication interface, and the display; and a controller configured to change the setting value of factor related to the operation of at least one of the content receiver, the communication interface, and the display, and to determine whether a risk of an operation error of at least one is caused due to the changed setting value. When it is determined that there is the risk of the operation error of at least one by the changed setting value, the controller may be configured to transmit information about the factor and the operation error to a service apparatus through the communication interface.

When the operation error of at least one of the content receiver, the communication interface, and the display is detected, the controller may be configured to determine whether the content receiver, the communication interface, and the display are at the risk of the operation error.

When an operation time of the display apparatus is greater than a reference time, the controller may be configured to determine whether the content receiver, the communication interface, and the display are at the risk of the operation error.

When the operation time of the display apparatus is greater than the reference time, the controller may be configured to determine whether the content receiver, the communication interface, and the display are at the risk of the operation error after a turn-off command is received from a user.

The controller may be configured to determine a normal operation range of the factor that causes at least one of the content receiver, the communication interface, and the display to operate normally while changing the factor value, and to determine whether there is the risk of the operation error of at least one of the content receiver, the communication interface, and the display by the setting value of the factor based on the normal operation range of the factor and the setting value of the factor.

When the setting value of the factor is outside the normal operation range of the factor, the controller may be configured to determine that there is the operation error of at least one of the content receiver, the communication interface, and the display.

The controller may be configured to determine a normal operation margin of the factor based on a difference between the setting value of the factor and an upper limit of the normal operation range of the factor and a difference between the setting value of the factor and a lower limit of the normal operation range of the factor, and to determine that there is the risk of the operation error of at least one of the content receiver, the communication interface, and the display when the normal operation margin of the factor is less than a reference operation margin.

The controller may be configured to change the setting value of the factor to increase the normal operation margin of the factor when the normal operation margin of the factor is less than the reference operation margin.

When it is not determined that there is the risk of the operation error of at least one of the content receiver, the communication interface, and the display by the changed setting value, the controller may be configured to store the changed setting value in the storage.

Another aspect of the disclosure provides a method of controlling a display apparatus, the display apparatus including a display, a content receiver, and a communication interface. The method includes: storing, by a storage, a setting value of factor related to an operation of the content receiver, the communication interface, and the display; and determining, by a controller, whether the content receiver, the communication interface, and the display are at a risk of an operation error; when it is determined that there is the risk of the operation error of at least one of the content receiver, the communication interface, and the display, determining, by the controller, whether the risk of the operation error is caused by a changed setting value while changing the setting value of the factor; and when it is determined that there is the risk of the operation error by the changed setting value, transmitting, by the controller, information about the factor and the operation error to a service apparatus through the communication interface.

Another aspect of the disclosure provides a display service system including: a display apparatus configured to display an image; and a service apparatus connected to the display apparatus through a communication network and configured to provide a service in response to an operation error of the display apparatus. The display apparatus includes a display configured to display the image; a content receiver configured to receive image content; a communication interface configured to communicate with the service apparatus through the communication network; a storage configured to store a setting value of factor related to an operation of the content receiver, the communication interface, and the display; and a controller configured to control the content receiver, the communication interface, and the display according to the setting value of the factor so that the image corresponding to the image content is displayed on the display. When it is determined that there is a risk of an operation error of at least one of the content receiver, the communication interface, and the display by the setting value of the factor, the controller may be configured to change the setting value of the factor. When it is determined that there is the risk of the operation error by the changed setting value, the controller may be configured to control the communication interface to transmit information about the factor and the operation error to the service apparatus.

According to an aspect of an embodiment, there is provided a display apparatus capable of self-diagnosing an operation error inside the display apparatus and/or an operation error with an external apparatus, and a method of controlling the same.

According to another aspect of an embodiment, there is provided a display apparatus capable of determining a risk of an operation error without stopping the operation, and a method of controlling the same.

According to another aspect of an embodiment, there is provided a display apparatus capable of providing various services for resolving an error according to a result of determining a risk of error, and a method of controlling the same.

DETAILED DESCRIPTION OF EXAMPLE EMBODIMENTS

Figure 1:
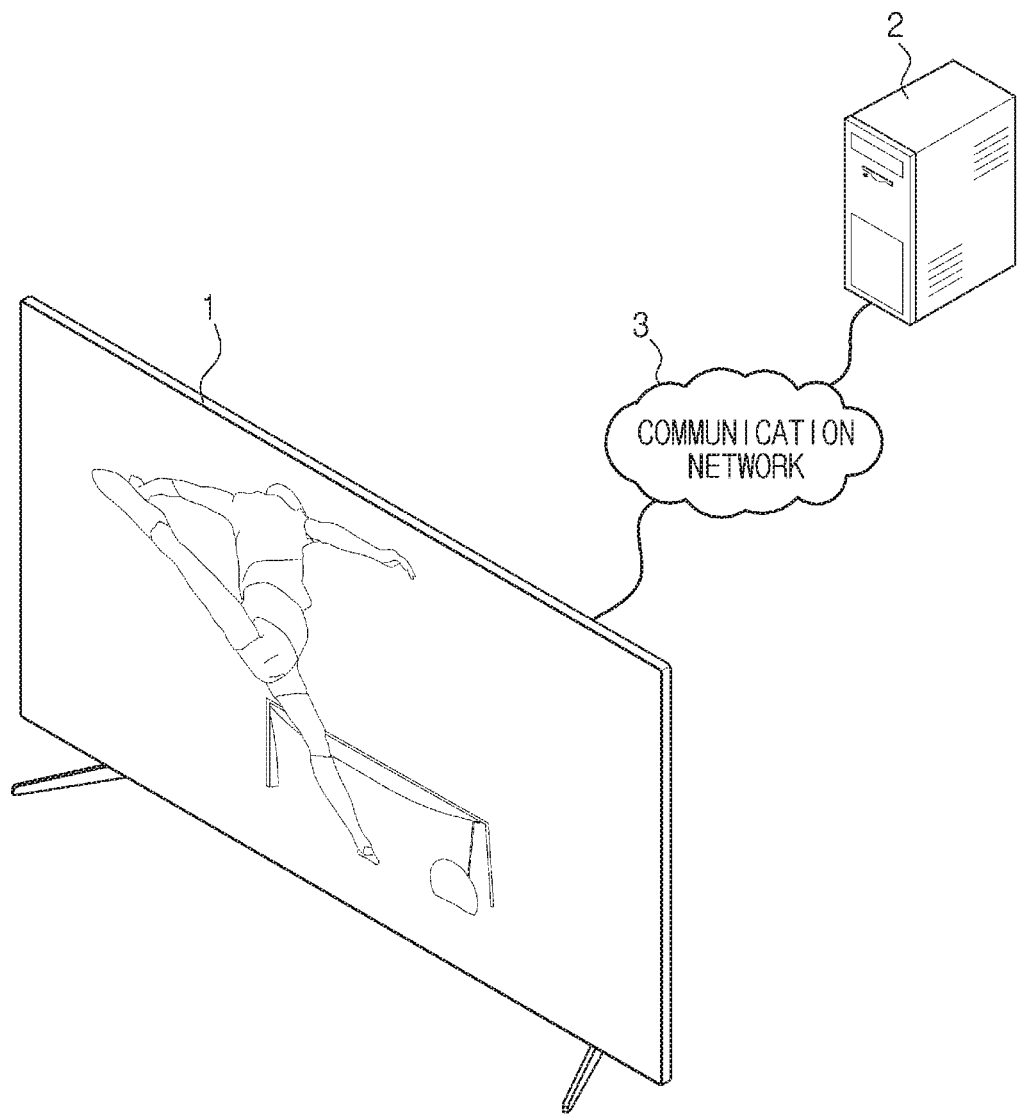
FIG. 1 is a view illustrating an electronic apparatus and a service apparatus according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings.

FIG. 1 is a view illustrating an electronic apparatus and a service apparatus according to an embodiment.

Referring to FIG. 1, an electronic apparatus 1 may be connected to a service apparatus 2 through a communication network 3.

The electronic apparatus 1 may provide various services to a user. For example, a display apparatus may display an image to the user, a refrigerator may store food refrigerated, and a washing machine may wash laundry.

FIG. 1 illustrates the display apparatus as an example of the electronic apparatus 1. However, the electronic apparatus 1 is not limited to the display apparatus illustrated in FIG. 1.

The electronic apparatus 1 may include a plurality of component units mounted on a printed circuit board (PCB) therein to implement various functions. Each of the component units may include an integrated circuit (IC) and peripheral circuits. The plurality of component units may include, for example, a user inputter, a storage, a communication interface, a power supply, and a controller.

The electronic apparatus 1 may check the operation by itself. For example, the electronic apparatus 1 may check individual operations of each of the plurality of component units, and may check an associated operation (e.g., communication) between the plurality of component units.

The electronic apparatus 1 may include a configurable factor to perform the operations of each of the plurality of component units. For example, the display apparatus performing image processing may store a setting value of factor for decoding the image, and may change the factor value according to user settings or the image.

While checking the individual operations of each of the plurality of component units, the electronic apparatus 1 may check the individual operation state of each of the plurality of component units while changing the value of each factor of the plurality of component units.

The electronic apparatus 1 may include a configurable factor for communication between the plurality of component units. The plurality of component units may be mounted on the PCB and may be connected to each other by conductors (e.g., signal lines, power lines, ground lines, etc.) on the PCB. Due to a tolerance of the conductors on the PCB, there may be distortion or attenuation of signals between the plurality of component units, and the distortion or attenuation of signals may be changed according to the value of the configurable factor.

Therefore, the electronic apparatus 1 may include the configurable factor for communication between the plurality of component units. For example, the controller may store the setting value of factor for communication with the storage, and may change the factor value according to the communication environment.

The electronic apparatus 1 may check an associated operation state between the plurality of component units while changing the factor value related to the plurality of component units while checking the associated operation between the plurality of component units.

In addition, the electronic apparatus 1 may transmit diagnostic data to the service apparatus 2 through the communication network 3 according to self-diagnosis results.

The communication network 3 may include both wired and wireless communication networks. The wired network may include an internet connection, such as through a cable network or a telephone network, and the wireless network may include Wi-Fi (WiFi™, IEEE 802.11 technology standard), Bluetooth (Bluetooth™, IEEE 802.15.1 technology standard), or ZigBee (ZigBee™, IEEE 802.15.4 technology standard). Of course, the communication network 3 is not limited to this, and may include a communication network of communication services to be implemented in the future.

For example, the communication network 3 may include an access point (AP), the electronic apparatus 1 may access the AP using a short-range wireless communication standard, and the AP may be connected to the Internet through a wired network provided by an Internet service provider. The short-range wireless communication may include communication methods such as Wi-Fi, Bluetooth, Zigbee, infrared (IrDA) communication, and ultra wide band (UWB) communication. In addition, the AP may be replaced by a hub, a router, a switch, a gateway, or the like.

The service apparatus 2 may be operated by a producer or a seller of the electronic apparatus 1 or a service agent. The service apparatus 2 may receive the diagnostic data from the electronic apparatus 1 through the communication network 3 and analyze the diagnostic data. In addition, the service apparatus 2 may perform appropriate countermeasures for errors in the electronic apparatus 1 according to the analysis result of the diagnostic data.

The service apparatus 2 may operate as a kind of cloud server. For example, the service apparatus 2 may receive diagnostic data received from the electronic apparatus 1 by providing hardware resources and/or software resources of the electronic apparatus 1, and may analyze the diagnostic data.

However, the service apparatus 2 is not limited to the cloud server. For example, the communication network 3 may be omitted, and the electronic apparatus 1 and the service apparatus 2 may be directly connected. When the electronic apparatus 1 and the service apparatus 2 are directly connected, the service apparatus 2 may be a peripheral device of the electronic apparatus 1, such as a desktop computer or a laptop computer.

Figure 2:
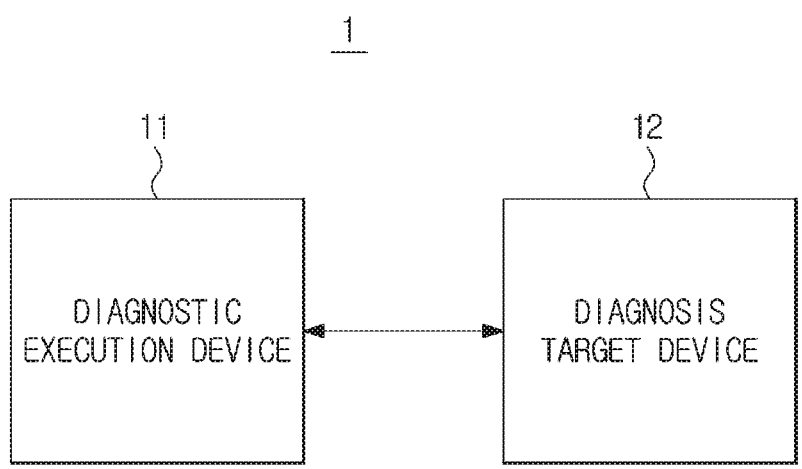
FIG. 2 is a view schematically illustrating a configuration of an electronic apparatus according to an embodiment.

FIG. 2 is a view schematically illustrating a configuration of an electronic apparatus according to an embodiment.

Referring to FIG. 2, a schematic configuration of the electronic apparatus 1 and a self-diagnosis operation of the electronic apparatus 1 are briefly described.

The electronic apparatus 1 may include a diagnostic execution device 11 for diagnosing the error of the electronic apparatus 1 and a diagnostic target device 12 that is a target of an error diagnosis.

The diagnostic execution device 11 may perform the error diagnosis of the diagnostic execution device 11 itself, or may perform the error diagnosis of the diagnostic target device 12. In addition, the diagnostic execution device 11 may perform the error diagnosis of communication between the diagnostic execution device 11 and the diagnostic target device 12.

The diagnostic execution device 11 may be a hardware resource such as the controller, a microprocessor or a microcontroller, or a software resource stored in the controller, the microprocessor, or the microcontroller.

The diagnostic target device 12 may be the target of the error diagnosis of the diagnostic execution device 11 and may output a response signal in response to a diagnostic signal of the diagnostic execution device 11.

The diagnostic target device 12 may be various configuration units included in the electronic apparatus 1. For example, the diagnostic target device 12 may be the microprocessor, a memory, a communication module, or the like.

The diagnostic execution device 11 may perform the error diagnosis on the diagnostic target device 12 when the error is detected, or may perform the error diagnosis on the diagnostic target device 12 when a condition for periodic check is satisfied. In other words, the diagnostic execution device 11 may perform the error diagnosis when detecting the error or may periodically perform the error diagnosis.

During the error diagnosis, the diagnostic execution device 11 may determine a risk (or error possibility) of the operation error of the diagnostic target device 12 and perform calibration to eliminate the risk of the operation error.

The risk of the operation error may be determined by a normal operation margin of the diagnostic target device 12. The normal operating margin may indicate a range of factor values that allow the diagnostic target device 12 to operate normally. In other words, even if the factor value related to the operation of the diagnostic target device 12 is changed within the normal operation margin, the diagnostic target device 12 may operate normally. The diagnostic execution device 11 may determine that the smaller the normal operation margin, the higher the risk of operation error, and may determine that the greater the normal operation margin, the lower the risk of operation error.

The diagnostic execution device 11 may test the operation of the diagnostic target device 12 while changing the factor value related to the operation of the diagnostic target device 12. For example, the diagnostic execution device 11 may provide the diagnostic signal to the diagnostic target device 12 while changing the factor value related to the operation of the diagnostic target device 12. The diagnostic target device 12 may provide the response signal to the diagnostic execution device 11 in response to the diagnostic signal, and the diagnostic execution device 11 may perform the error diagnosis of the diagnostic target device 12 based on the response signal of the diagnostic target device 12.

The setting value of factor related to the operation of the diagnostic target device 12 may be the setting value of factor related to the individual operation of the diagnostic target device 12 and/or the setting value of factor related to the associated operation (e.g., communication operation) between the diagnostic execution device 11 and the diagnostic target device 12.

The diagnostic execution device 11 may change the factor value related to the individual operation of the diagnostic target device 12. For example, when the diagnostic target device 12 is the communication interface, the diagnostic execution device 11 may change the factor value related to the operation in which the communication interface communicates with an external apparatus. The diagnostic execution device 11 may change the factor value related to a sampling period in which the communication interface samples the signal, or may change the factor value related to error correction in which the communication interface corrects the error in the signal, or may change the factor value related to equalization in which the communication interface compensates for distortion caused by a channel.

In addition, the diagnostic execution device 11 may change the factor value related to the associated operation (e.g., communication within the display apparatus) between the diagnostic target device 12 and the diagnostic execution device 11. The diagnostic execution device 11 may change the factor value related to a time point (sampling delay) in which the diagnostic target device 12 samples a communication signal of the diagnostic execution device 11, or may change the factor value related to a strength of the communication signal.

The setting value of factor may be stored in a specific register provided in the diagnostic execution device 11 and/or the diagnostic target device 12, and the diagnostic execution device 11 may change the setting value of factor stored in the register to test the operation of the diagnostic target device 12.

In addition, the diagnostic signal may be the signal related to the operation of the diagnostic target device 12, and a reference response signal corresponding to the diagnostic signal of the diagnostic execution device 11 may be stored in the diagnostic execution device 11 in advance. The reference response signal may indicate the response signal output from the diagnostic target device 12 during normal operation of the diagnostic target device 12.

For example, when the diagnostic target device 12 is the memory, the diagnostic execution device 11 may provide the diagnostic data to the memory along with a store command Thereafter, the diagnostic execution device 11 may provide a loading command of the diagnostic data to the memory, and the memory may provide the diagnostic data to the diagnostic execution device 11. The diagnostic execution device 11 may compare the diagnostic data provided with the store command in the memory and response data (diagnostic data stored in the memory) output from the memory, and may determine whether the memory operates normally according to the comparison result.

The diagnostic execution device 11 may determine the risk (or possibility of error) of the operation error of the diagnostic target device 12 by a current setting value of the factor based on whether the diagnostic target device 12 is operated normally according to the change of the factor value. In addition, the diagnostic execution device 11 may determine the risk of the operation error based on the normal operation margin of factors related to the operation of the electronic apparatus 1.

If the risk of the operation error of the diagnostic target device 12 according to the current setting value of the factor is determined, the diagnostic execution device 11 may perform calibration. For example, the diagnostic execution device 11 may change the setting value of factor of the diagnostic target device 12, and may determine the risk (or possibility of error) of the operation error of the diagnostic target device 12 due to the changed setting value.

When the risk of the operation error is not determined, the diagnostic execution device 11 may set a corresponding factor with the changed setting value. In this way, by changing the factor value, the diagnostic execution device 11 may eliminate the risk of the operation error of the diagnostic target device 12.

If the risk of the operation error is still determined, the diagnostic execution device 11 may transmit the diagnostic data to the service apparatus 2. The service apparatus 2 may analyze the received diagnostic data and provide the user with countermeasures to eliminate the risk of the operation errors.

As described above, the diagnostic execution device 11 may test the operation of the diagnostic target device 12 while changing the factor value related to the operation of the diagnostic target device 12, and may calibrate the setting value of factor related to the operation of the diagnostic target device 12 according to the test result of the operation.

The diagnostic method described above may exhibit a remarkable effect in an apparatus in which it is difficult for an expert to diagnose the operation error using a separate diagnostic apparatus or a diagnostic kit. For example, the above diagnostic method may have the remarkable effect on a household appliance used by the user with little knowledge of the electronic apparatus in a general home or an outdoor electronic apparatus installed on a street where many people pass by.

In addition, the above diagnostic method may automatically detect the operation error or the risk of the operation error while the user does not recognize the operation error, and may provide the user with the countermeasure corresponding to the operation error. Therefore, the above diagnostic method may be usefully used in the display apparatus in which the operation error is visually clearly visible to the user.

After all, the above diagnostic method may be usefully used in a home display apparatus (e.g., digital television, etc.) used in the general home or an outdoor display apparatus (e.g., digital signage, etc.) installed outdoors. Particularly, before the user is inconvenienced by not being able to use the display apparatus, the display apparatus itself may detect the risk of the operation error and provide the countermeasure corresponding to the operation error. In addition, the display apparatus may detect the risk of the operation error by itself and provide the countermeasure corresponding to the operation error without the inconvenience of the user checking the operation error of the outdoor display apparatus.

However, the above diagnostic method is not limited to the home display apparatus and the outdoor display apparatus, and may be applied to various types of display apparatus.

Hereinafter, a specific configuration and self-diagnosis operation of the display apparatus as an example of the electronic apparatus 1 according to the embodiment will be described in detail.

Figure 3:
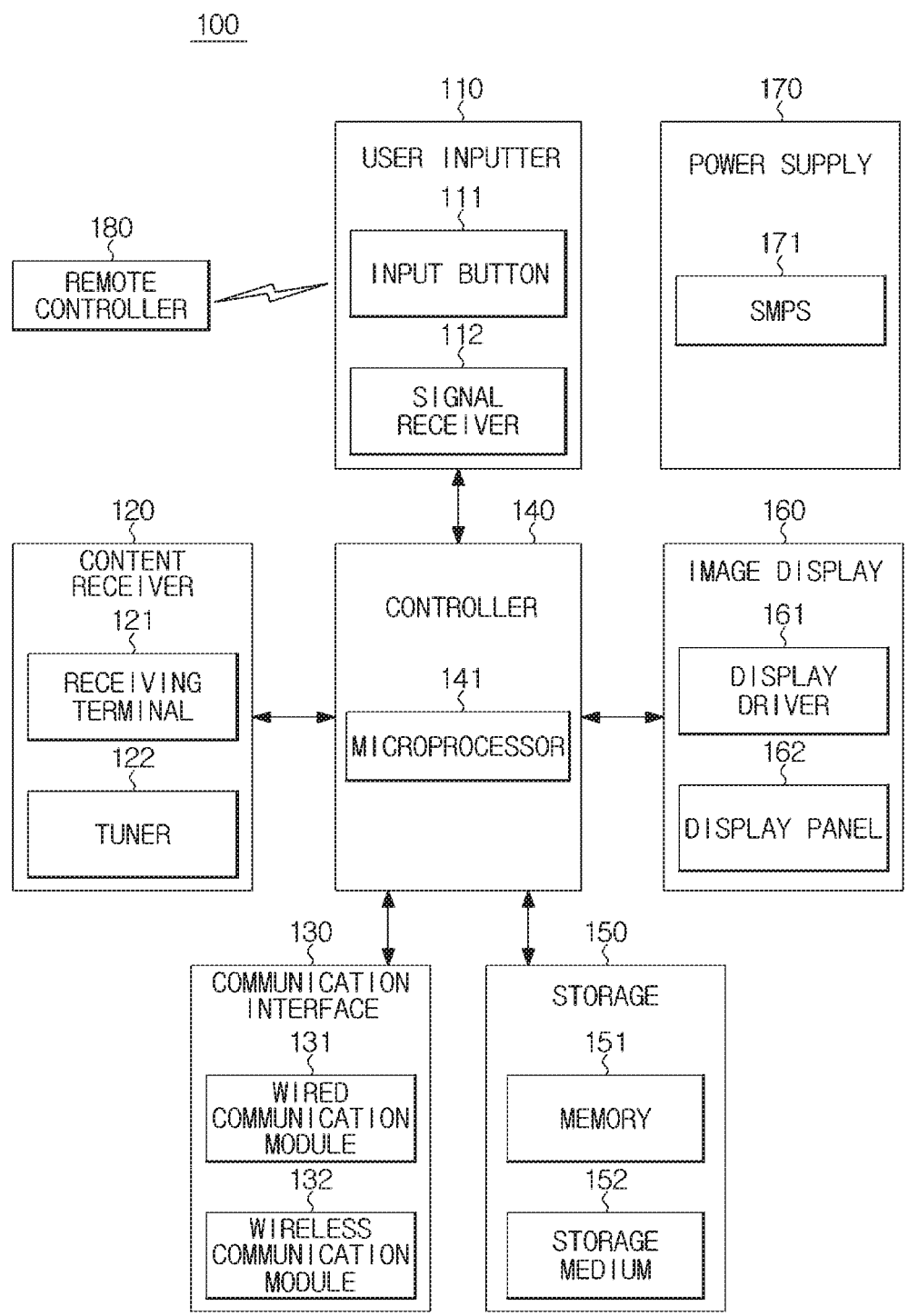
FIG. 3 is a view illustrating a configuration of a display apparatus according to an embodiment.

FIG. 3 is a view illustrating a configuration of a display apparatus according to an embodiment.

A display apparatus 100 is an apparatus capable of processing an image signal received from the outside (e.g., external image source) and visually displaying the processed image. As illustrated in FIG. 1, the display apparatus 100 may be implemented as a digital television (DTV) or a digital signage, but the embodiment of the display apparatus 100 is not limited thereto. For example, the display apparatus 100 may be implemented as a monitor of a computer, or may be included in a navigation terminal device or various portable terminal devices. Here, the portable terminal devices may be a desktop computer, a laptop computer, a smartphone, a tablet personal computer (PC), a wearable computing device, or a personal digital assistant (PDA).

In addition, the display apparatus 100 may be a large format display (LFD) installed outdoors such as on a building roof or at a bus stop. The outdoors is not necessarily limited to the outside, but should be understood as a concept including a place where a large number of people can go in and out, even an area such as a subway station, a shopping mall, a movie theater, a company, a store, etc.

The display apparatus 100 may receive video/audio signals from various content sources, and may display an image (image frame) corresponding to the video/audio signals. For example, the display apparatus 100 may receive a television broadcast signal through a broadcast receiving antenna or a cable, receive the video/audio signals from a content reproduction device, or receive the video/audio signals from a content providing server of a content provider.

As illustrated in FIG. 3, the display apparatus 100 may include a user inputter 110 for receiving a user input from the user, a content receiver 120 for receiving the video/audio signals from the content sources, a communication interface 130 for communicating with the content sources and/or external apparatuses, a controller 140 for processing the video/audio signals received by the content receiver 120 and/or the communication interface 130 and controlling the operation of the display apparatus 100 according to the user input, a storage 150 for storing image data under the control of the controller 140, an image display 160 for displaying the image frame processed by the controller 140, and a power supply 170 for supplying power to each of components included in the display apparatus 100.

The user inputter 110 may include input buttons 111 for receiving the user input. For example, the user inputter 110 may include a power button for turning on or off the display apparatus 100, a channel selection button for selecting broadcast content displayed on the display apparatus 100, a sound control button for adjusting the volume of the sound output by the display apparatus 100, a source selection button for selecting the content source, and the like.

The input buttons 111 may each receive the user input and output an electrical signal corresponding to the user input to the controller 140. The input buttons 111 may be implemented by various input devices, such as a push switch, a touch switch, a dial, a slide switch, a toggle switch, and the like.

The user inputter 110 may also include a signal receiver 112 for receiving a remote control signal of a remote controller 180. The remote controller 180 for receiving the user input may be provided separately from the display apparatus 100, and may receive the user input and transmit a radio signal corresponding to the user input to the display apparatus 100. The signal receiver 112 may receive the radio signal corresponding to the user input from the remote controller 180 and output an electrical signal corresponding to the user input to the controller 140.

The content receiver 120 may include a receiving terminal 121 and a tuner 122 that receive the content including the video and audio from the content sources.

The receiving terminal 121 may receive the video/audio signals from the content sources through a cable.

The receiving terminal 121 may be, for example, a component (YPbPr/RGB) terminal, a composite (composite video blanking and sync (CVBS)) terminal, an audio terminal, a high definition multimedia interface (HDMI) terminal, a universal serial bus (USB) terminal, and the like.

The tuner 122 may receive broadcast signals through the broadcast receiving antenna or a wired cable and extract a broadcast signal of a channel selected by the user from the broadcast signals. For example, the tuner 122 may pass a broadcast signal having a frequency corresponding to a channel selected by the user among a plurality of the broadcast signals received through the broadcast receiving antenna or the wired cable, and block the broadcast signals having other frequencies.

As such, the content receiver 120 may receive the video/audio signals from the content sources through the receiving terminal 121 and/or the tuner 122, and may output the video/audio signals received through the receiving terminal 121 and/or the tuner 122 to the controller 140.

The communication interface 130 may communicate with the content sources and/or the external apparatuses. In particular, the communication interface 130 may receive the video/audio signals from the content sources.

The communication interface 130 may include a wired communication module 131 and a wireless communication module 132 that can exchange data with the content sources and/or the external apparatuses.

The wired communication module 131 may be connected to the communication network 3 through the cable, and may exchange data with the content sources and/or the external apparatuses through the communication network 3. For example, the wired communication module 131 may access the communication network 3 through Ethernet (IEEE 802.3 technology standard), and exchange data with the content sources and/or the external apparatuses.

The wireless communication module 132 may communicate wirelessly with the AP, and may access the communication network 3 through the AP. For example, the wireless communication module 132 may communicate with the AP through Wi-Fi, Bluetooth, and Zigbee. The wireless communication module 132 may access the communication network 3 through the AP and exchange data with the content sources and/or the external apparatuses.

The communication interface 130 may transmit the diagnostic data of the controller 140 to the service apparatus 2.

The controller 140 may include a microprocessor 141 that processes the video/audio signals received by the content receiver 120 and/or the communication interface 130.

The microprocessor 141 may decode the video/audio signals. For example, for transmission efficiency of the image data, the video/audio signals may be compressed by various video compression standards such as Moving Picture Experts Group (MPEG) and High Efficiency Video Coding (HEVC), and the compressed image data may be transmitted.

The microprocessor 141 may generate image frame data for reproducing the image by decoding the video/audio signals using the video compression standards. The microprocessor 141 may output the image frame data to the image display 160 to reproduce the image.

The microprocessor 141 may receive the signal related to the user input from the user inputter 110. The microprocessor 141 may generate a control signal for controlling the operations of the content receiver 120, the communication interface 130, the storage 150, and/or the image display 160 according to the user input, and may output the control signal to the content receiver 120, the communication interface 130, the storage 150 and/or the image display 160.

The microprocessor 141 may perform the error diagnosis of the display apparatus 100 at the time of error detection and/or periodically. For example, the microprocessor 141 may execute a diagnostic program for diagnosing the errors in the user inputter 110, the content receiver 120, the communication interface 130, the storage 150, the image display 160, the power supply 170, and the controller 140.

According to the result of the error diagnosis, the microprocessor 141 may generate the diagnostic data indicating the error diagnosis result, and store the diagnostic data in the storage 150. Furthermore, the microprocessor 141 may generate the control signal for transmitting the diagnostic data to the service apparatus 2.

The microprocessor 141 may include the operation circuit to perform logic operations and arithmetic operations and a memory circuit (e.g., register) to temporarily store computed data.

As such, the controller 140 may decode the video/audio signals, control the operation of the components included in the display apparatus 100, and diagnose the error of the operation of the components included in the display apparatus 100.

The storage 150 may store data and/or data for controlling the display apparatus 100 by the controller 140, and temporarily store the data generated by the controller 140 during the operation of the display apparatus 100. For example, temporary image data may be temporarily stored.

The storage 150 may include a memory 151 for temporarily storing the data and a storage medium 152 for storing the data for a long period of time.

The memory 151 may store the temporary image data generated while the microprocessor 141 is decoding the video/audio signals.

The memory 151 may store the setting value of factor related to the operation of the display apparatus 100. For example, the memory 151 may set the setting value of factors related to decoding the video/audio signals of the microprocessor 141, the setting value of factors related to data communication between the microprocessor 141 and the memory 151, and the like. The memory 151 may also store the setting values of various factors.

In addition, the memory 151 may store temporary data generated while the microprocessor 141 performs error diagnosis. For example, the memory 151 may store whether or not the display apparatus 100 operates normally according to the setting value of factor related to the operation of the display apparatus 100, and present the parameters related to the operation of the display apparatus 100, and may store the normal operation margin according to the current setting value of factor related to the operation of the display apparatus 100.

The memory 151 may include, for example, a non-volatile memory such as static random access memory (S-RAM) and dynamic random access memory (D-RAM).

The storage medium 152 may store a program (a series of instructions) and/or data in which the microprocessor 141 decodes the video/audio signals.

The storage medium 152 may store the setting value of factor particularly related to the operation of the display apparatus 100. While the memory 151 temporarily stores the setting value of factor, the storage medium 152 may store the setting value of factor for a long period of time so that the setting value is not lost even when the power is turned off.

The storage medium 152 may include read only memory (ROM), flash memory, a solid state drive (SSD), a hard disk drive (HDD), or the like.

The image display 160 may include a display panel 162 for visually displaying the image and a display driver 161 for driving the display panel 162.

The display panel 162 may generate the image according to the image frame data received from the display driver 161 and display the image.

The display panel 162 may include a pixel serving as a unit for displaying the image. Each of the pixels may receive an electrical signal representative of the image from the display driver 161 and output an optical signal corresponding to the received electrical signal. As described above, the optical signals output by the plurality of pixels may be combined and displayed on the display panel 162.

The display driver 161 may receive the image frame data from the controller 140 and may drive the display panel 162 to display the image corresponding to the received image frame data. Particularly, the display driver 161 may transmit the electrical signal corresponding to the image frame data to each of the plurality of pixels constituting the display panel 162.

When the display driver 161 transmits the electrical signal corresponding to the image frame data to each pixel constituting the display panel 162, each of the pixels may output light corresponding to the received electrical signal, and the light output by each of the pixels may be combined to form a single image.

The power supply 170 may supply power to the user inputter 110, the content receiver 120, the communication interface 130, the controller 140, the storage 150, the image display 160, and all the other components included in the display apparatus 100 under the control of the controller 140.

The power supply 170 may include a switching mode power supply 171 (hereinafter, referred to as 'SMPS').

The SMPS 171 may include an AC-DC converter for converting alternating current (AC) power of an external power source to direct current (DC) power, and a DC-DC converter for changing a voltage of DC power. For example, the AC power of an external power source may be converted into DC power by the AC-DC converter, and the voltage of the DC power may be changed into various voltages (e.g., 5V and/or 15V) by the DC-DC converter.

The DC power may be supplied to the user inputter 110, the content receiver 120, the communication interface 130, the controller 140, the storage 150, the image display 160, and all the other components included in the display apparatus 100.

Figure 4:
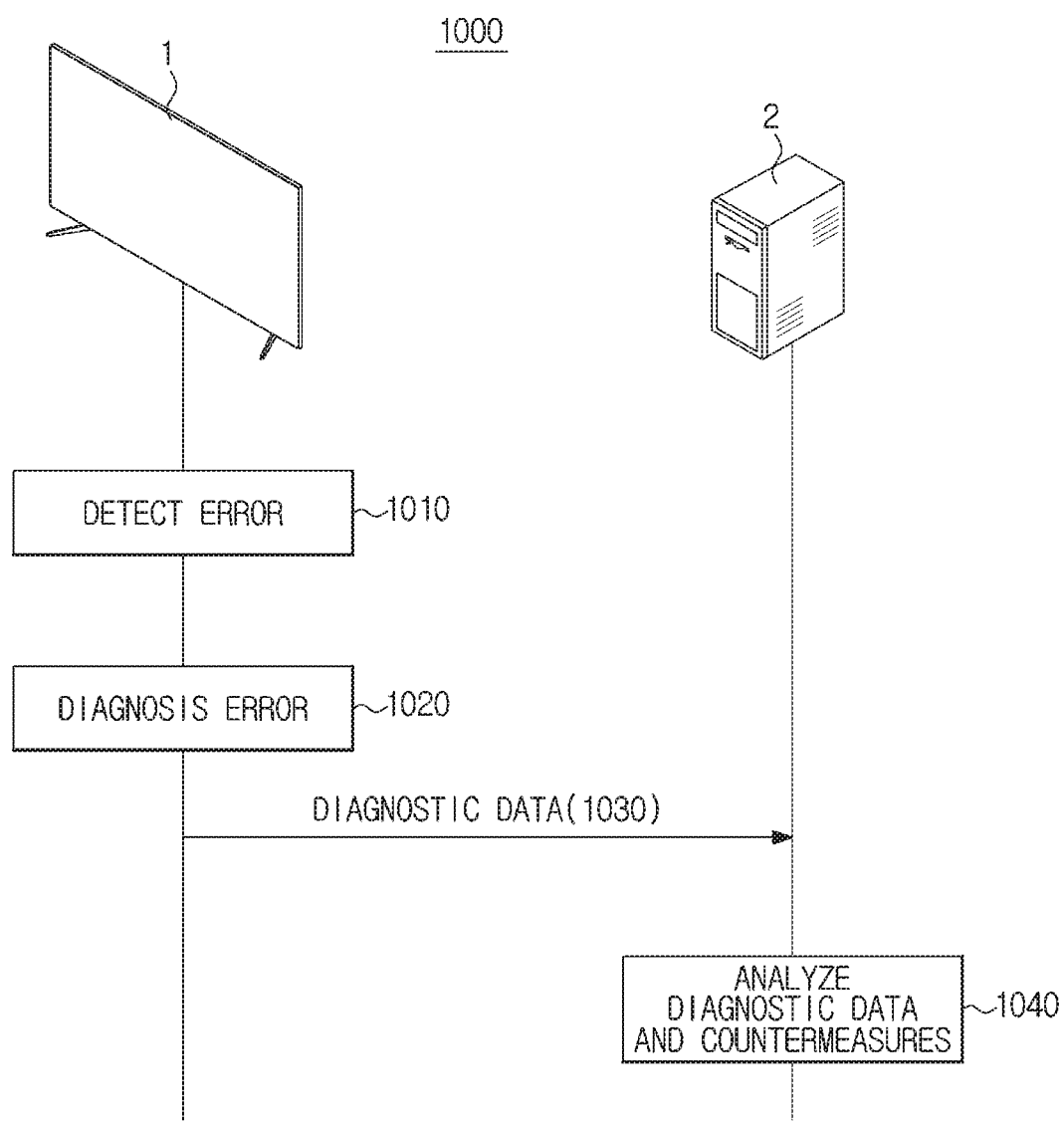
FIG. 4 is a view illustrating an operation of a display apparatus and a service apparatus according to an embodiment.

FIG. 4 is a view illustrating an operation of a display apparatus and a service apparatus according to an embodiment.

Referring to FIG. 4, a diagnostic operation 1000 of the display apparatus 100 and the service apparatus 2 is described.

The display apparatus 100 may monitor the operation error of the display apparatus 100 (1010).

While the display apparatus 100 is operating, the controller 140 may monitor the operation error of the display apparatus 100.

For example, the controller 140 may monitor a reception error of the video/audio signals by the content receiver 120 and/or the communication interface 130, a decoding error of the video/audio signals by the controller 140, a display error of the image frame by the image display 160, a storage error of data by the storage 150, and a power supply error by the power supply 170.

The display apparatus 100 may perform the error diagnosis by itself (1020).

The controller 140 may perform the error diagnosis of the components included in the display apparatus 100 when the operation error of the display apparatus 100 is detected, or may perform the error diagnosis of the components included in the display apparatus 100 when a periodic inspection condition is satisfied. In other words, the controller 140 may perform the error diagnosis or periodically perform the error diagnosis when detecting the operation error of the display apparatus 100.

When the operation error of the display apparatus 100 is detected, the controller 140 may perform the error diagnosis of the specific configuration in which the error is detected. When the periodic inspection condition is satisfied, the controller 140 may perform the error diagnosis of a plurality of the components included in the display apparatus 100.

When the operation error of the display apparatus 100 is detected or the periodic inspection condition is satisfied, the controller 140 may immediately perform the error diagnoses of the display apparatus 100. When the operation error of the display apparatus 100 is detected or the user's turn-off command is input after the periodic inspection condition is satisfied, the controller 140 may perform the error diagnosis of the display apparatus 100.

During the execution of the error diagnosis, the controller 140 may determine the risk (error possibility) of the operation error of the components included in the display apparatus 100, and may perform calibration to eliminate the risk of the operation error. The risk of an operation error may be determined by the normal operation margin of the diagnostic target device 12. The normal operation margin may indicate the range of factor values that cause the display apparatus 100 to operate normally. The controller 140 may determine the risk of the operation error based on the normal operation margin of factors related to the operation of the display apparatus 100.

When the risk of the operation error is detected, the controller 140 may perform calibration. For example, the controller 140 may change the factor value related to the operation of the display apparatus 100 and determine the risk of the operation error again.

When the risk of the operation error is not determined after changing the setting value of factor related to the operation of the display apparatus 100, the controller 140 may store the changed setting value for the factors related to the operation of the display apparatus 100.

The display apparatus 100 may transmit the diagnostic data due to the error diagnosis to the service apparatus 2 (1030).

When the risk of the operation error is still detected after changing the setting value of factor related to the operation of the display apparatus 100, the controller 140 may control the communication interface 130 to transmit the diagnostic data to the service apparatus 2.

The diagnostic data may include data related to the operation error of the display apparatus 100 (e.g., environmental data when the operation error occurs), and data related to the error diagnosis of the display apparatus 100 (e.g., the factor causing the operation error, the range of the factor value that causes the display apparatus to operate normally, or the like).

The service apparatus 2 may analyze the diagnostic data of the display apparatus 100 and provide the countermeasures to the user (1040).

The service apparatus 2 may receive the diagnostic data of the display apparatus 100 and analyze the diagnostic data of the display apparatus 100.

The service apparatus 2 may provide various countermeasures to the user according to the analysis result of the diagnostic data.

For example, the service apparatus 2 may call a service representative so that the service representative of the display apparatus 100 visits the user. The service apparatus 2 may transmit a message including a user action to the display apparatus 100 so that the user action that can be performed by the user is displayed in order to resolve the operation error of the display apparatus 100. In addition, the service apparatus 2 may transmit a service receipt guide message to the display apparatus 100 so that a guide message for receiving the display apparatus 100 in the service center is displayed.

As described above, the display apparatus 100 may perform the error diagnosis on its own, and if the risk of the operation error is detected, the operation error may be resolved through calibration. In addition, if the operation error is not resolved by calibration, the display apparatus 100 may transmit the diagnostic data related to the error diagnosis to the service apparatus 2. The service apparatus 2 may analyze the diagnostic data and provide the appropriate countermeasures to the user according to the analysis result of the diagnostic data.

Hereinafter, the operation of each of the display apparatus 100 and the service apparatus 2 is described.

Figure 5:
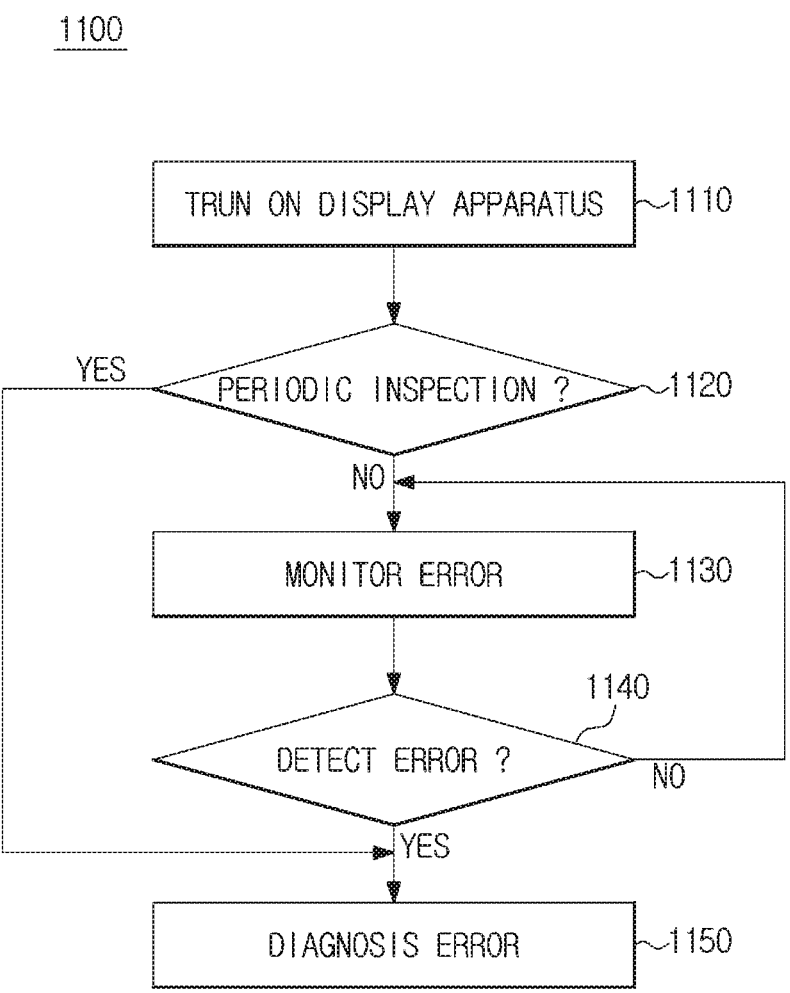
FIG. 5 is a view illustrating an error monitoring operation of a display apparatus according to an embodiment.

FIG. 5 is a view illustrating an error monitoring operation of a display apparatus according to an embodiment.

Referring to FIG. 5, an error monitoring operation 1100 of the display apparatus 100 is described.

The display apparatus 100 may be turned on (1110).

The display apparatus 100 may be turned on automatically or by the user input. For example, the display apparatus 100 may be turned on by the user's turn-on command through the user inputter 110 or the remote controller 180. In addition, when the user has set the turn-on command, the display apparatus 100 may be turned on at a time determined by the user.

When turned on automatically or by the user input, power may be supplied to the components of the display apparatus 100 by the power supply 170, and the controller 140 may check the components of the display apparatus 100.

Then, the display apparatus 100 may determine whether the periodic inspection condition is satisfied (1120).

The controller 140 may determine whether the periodic inspection condition is satisfied before performing a periodic inspection, and may perform the periodic inspection of the display apparatus 100 when the periodic inspection condition is satisfied.

The periodic inspection condition may include various conditions. The periodic inspection condition may include an operating time of the display apparatus 100, whether the software of the display apparatus 100 is updated, whether the display apparatus 100 is initialized, and an elapsed time since the manufacture of the display apparatus 100.

For example, when an operation time of the display apparatus 100 exceeds a first reference time, the controller 140 may perform the periodic inspection of the display apparatus 100 and initialize the operation time of the display apparatus 100 for the periodic inspection. Particularly, when the first reference time is set to 100 hours, the controller 140 may perform the periodic inspection of the display apparatus 100 whenever the operation time of the display apparatus 100 reaches 100 hours.

When the elapsed time after the manufacture of the display apparatus 100 exceeds a second reference time, the controller 140 may perform the periodic inspection of the display apparatus 100.

In addition, when the display apparatus 100 is turned on for the first time after the software of the display apparatus 100 is updated or the display apparatus 100 is first turned on after the display apparatus 100 is initialized, the controller 140 may perform the periodic inspection of the display apparatus 100.

When the periodic inspection condition is not satisfied (NO in 1120), the display apparatus 100 may monitor the operation error (1130).

While the display apparatus 100 is operating, the controller 140 may monitor the operation error of the display apparatus 100. The operation error may be defined by a designer and/or the user of the display apparatus 100.

For example, the operation error may include the reception error of the video/audio signals by the content receiver 120 and/or the communication interface 130, the decoding error of the video/audio signals by the controller 140, the display error of the image frame by the image display 160, the storage error of data by the storage 150, and the power supply error by the power supply 170. In addition, the operation error may include an unknown error that cannot determine the cause of the error and the configuration in which the error occurred.

While monitoring the operation error, the display apparatus 100 may determine whether the operation error is detected (1140).

During the operation of the display apparatus 100, the controller 140 may monitor the operation error of the display apparatus 100 and determine whether the operation error of the display apparatus 100 has occurred.

When the operation error is not detected (NO in 1140), the display apparatus 100 may continue monitoring the operation error.

When the periodic inspection condition is satisfied (YES in 1120) or the operation error is detected (YES in 1140), the display apparatus 100 may perform the error diagnosis by itself (1150).

The controller 140 may perform the error diagnosis of the components included in the display apparatus 100 when the operation error of the display apparatus 100 is detected, or may perform the error diagnosis of the components included in the display apparatus 100 when a periodic inspection condition is satisfied. In other words, the controller 140 may perform the error diagnosis or periodically perform the error diagnosis when detecting the operation error of the display apparatus 100.

When the operation error of the display apparatus 100 is detected, the controller 140 may perform the error diagnosis of the specific configuration in which the error is detected. For example, when the reception error of the video/audio signals is detected, the controller 140 may perform the error diagnosis of the content receiver 120 and/or the communication interface 130. When the decoding error of the video/audio signals is detected, the controller 140 may perform the error diagnosis of the controller 140. When display error of the image frame is detected, the controller 140 may perform the error diagnosis of the image display 160. When the storage error of data is detected, the controller 140 may perform the error diagnosis of the storage 150. In addition, when the error of the power supply is detected, the controller 140 may perform the error diagnosis of the power supply 170.

The controller 140 may perform the error diagnosis of the plurality of components included in the display apparatus 100 when a configuration in which the operation error has occurred cannot be specified.

In addition, when the periodic inspection condition is satisfied, the controller 140 may perform the error diagnosis of the plurality of components included in the display apparatus 100. For example, when the periodic inspection condition is satisfied, the controller 140 may perform the error diagnosis for the user inputter 110, the content receiver 120, the communication interface 130, the storage 150, the image display 160, the power supply 170, the controller 140, and the like.

When the operation error of the display apparatus 100 is detected or the periodic inspection condition is satisfied, the controller 140 may immediately perform the error diagnosis of the display apparatus 100. When the operation error of the display apparatus 100 is detected or the user's turn-off command is input after the periodic inspection condition is satisfied, the controller 140 may perform the error diagnosis of the display apparatus 100.

Since data throughput of the controller 140 is increased by the error diagnosis, the controller 140 may perform the error diagnosis of the display apparatus 100 after the user's turn-off command is input (that is, when the user does not use the display apparatus). For example, when the user's turn-off command is input after the periodic inspection condition is satisfied, the controller 140 may terminate the operation of the image display 160 (that is, turns off the display panel), and may perform the error diagnosis of the display apparatus 100. However, when the operation error of the display apparatus 100 is detected and the operation of the display apparatus 100 due to the operation error is significantly limited, the controller 140 may perform the error diagnosis of the display apparatus 100 immediately upon detecting the operation error of the display apparatus 100.

The controller 140 may perform the error diagnosis by the detection of the operation error and the error diagnosis by satisfaction of the periodic inspection condition at different times. For example, the controller 140 may perform the error diagnosis of the display apparatus 100 immediately after the operation error of the display apparatus 100 is detected. When the user's turn-off command is input after the periodic inspection condition is satisfied, the controller 140 may perform the error diagnosis of the display apparatus 100. In addition, the controller 140 may perform the error diagnosis of the display apparatus 100 when the user's turn-off command is input after the operation error of the display apparatus 100 is detected, and may perform the error diagnosis of the display apparatus 100 immediately after the periodic inspection condition is satisfied.

As described above, the display apparatus 100 may perform the error diagnosis by itself when the operation error is detected or the periodic inspection condition is satisfied. Also, the display apparatus 100 may perform the error diagnosis as soon as the operation error is detected or as soon as the periodic inspection condition is satisfied. Alternatively, the display apparatus 100 may perform the error diagnosis when the operation error is detected or the turn-off command of the display apparatus 100 is input after the periodic inspection condition is satisfied.

Figure 6:
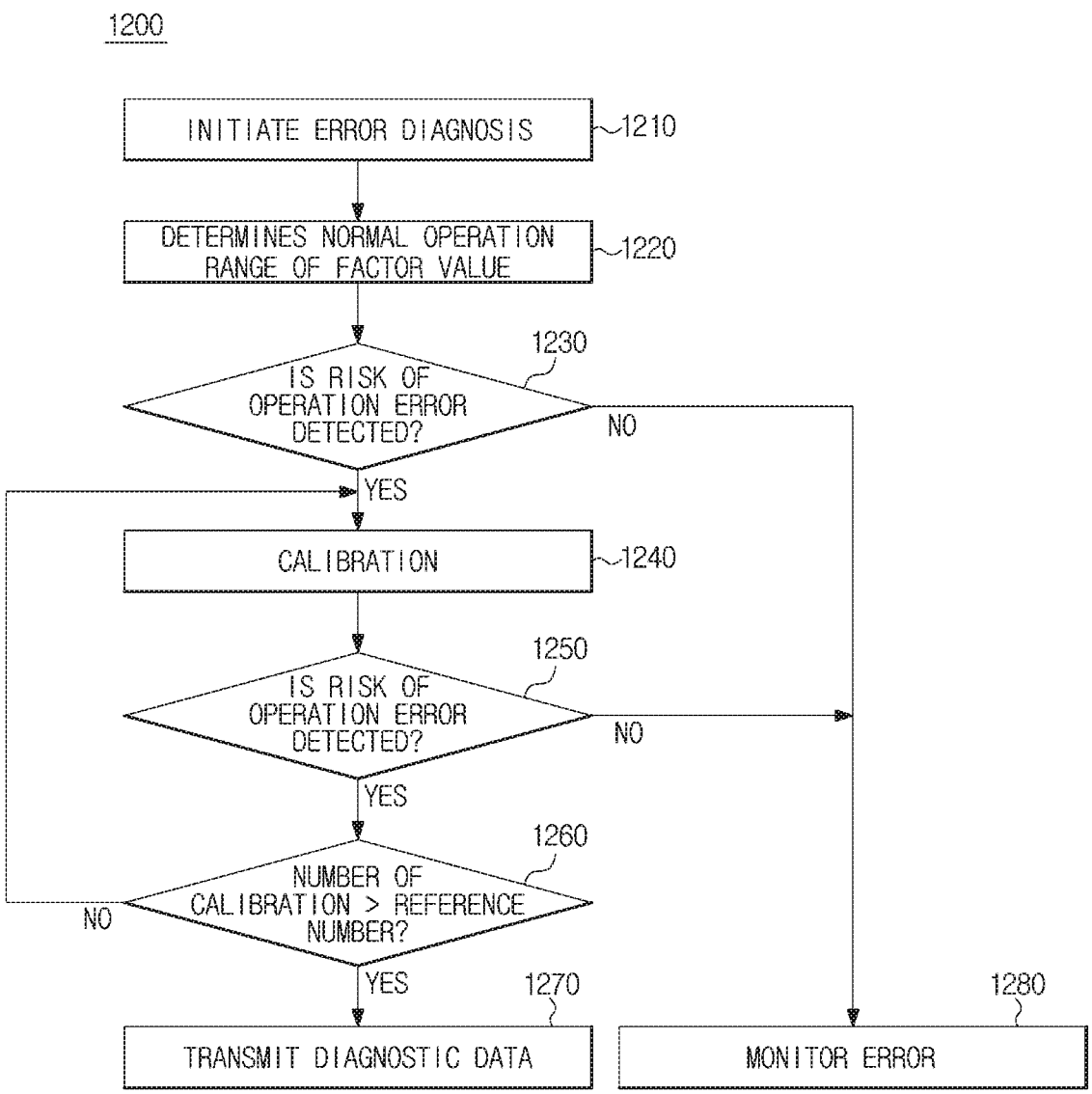
FIG. 6 is a view illustrating an error diagnosis operation of a display apparatus according to an embodiment.
Figure 7:
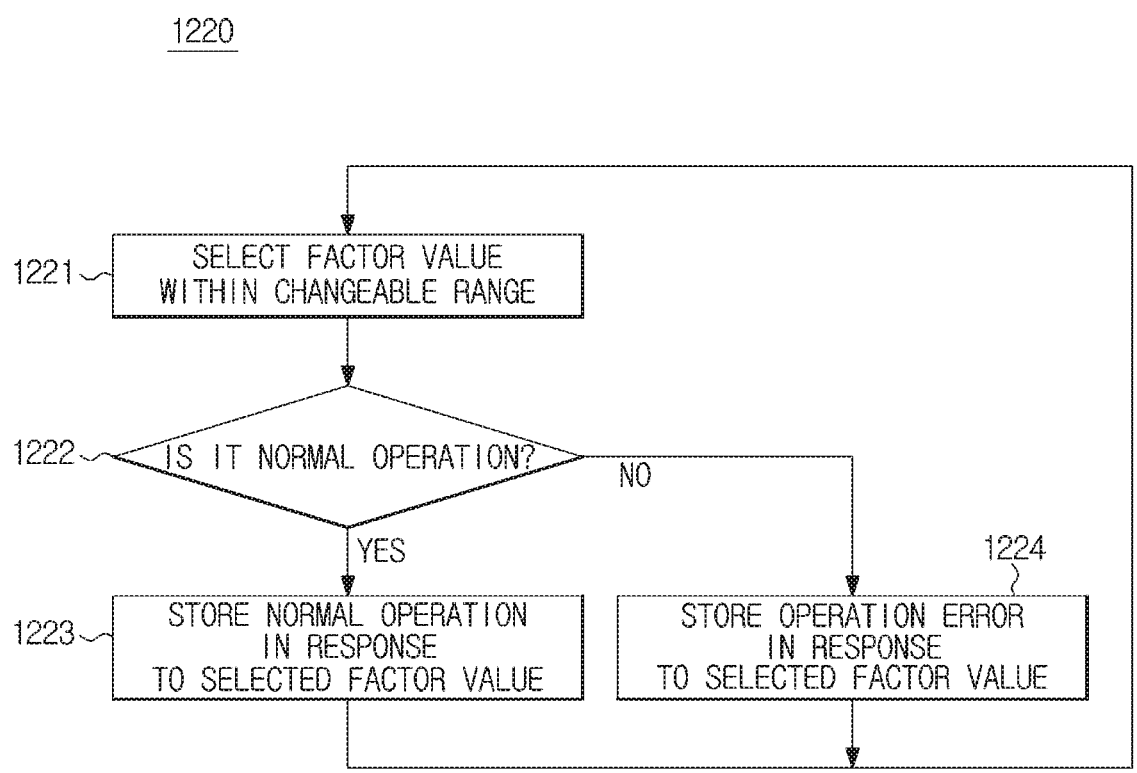
FIG. 7 is a view illustrating a method of determining a normal operation range of a factor value illustrated in FIG. 6.
Figure 9:
Figure 9:
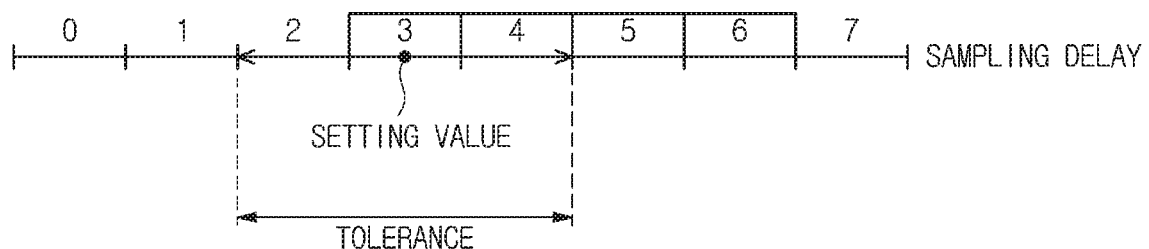
Figure 10:
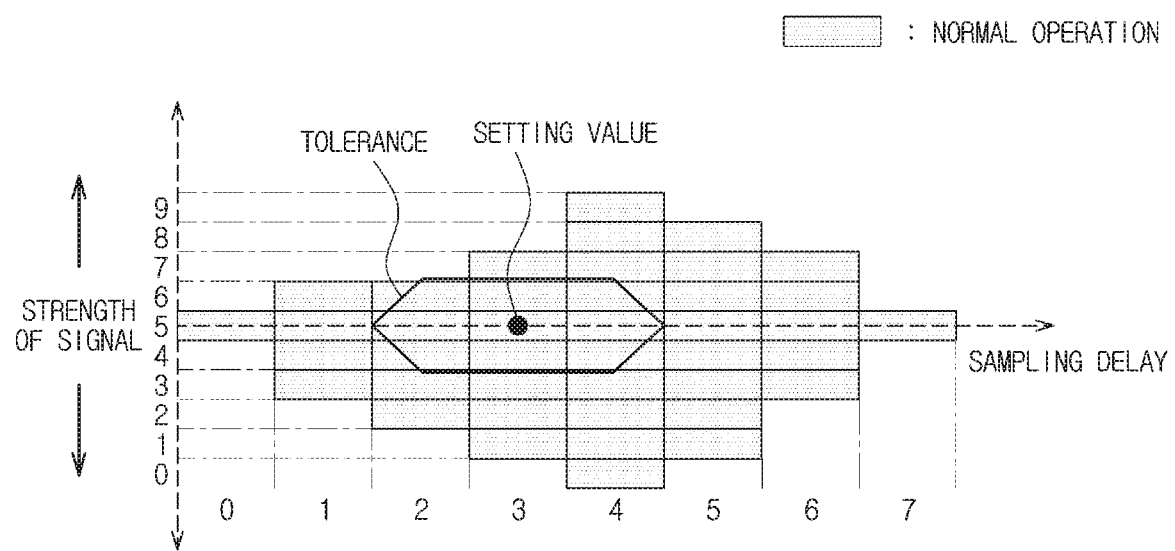
Figure 11:
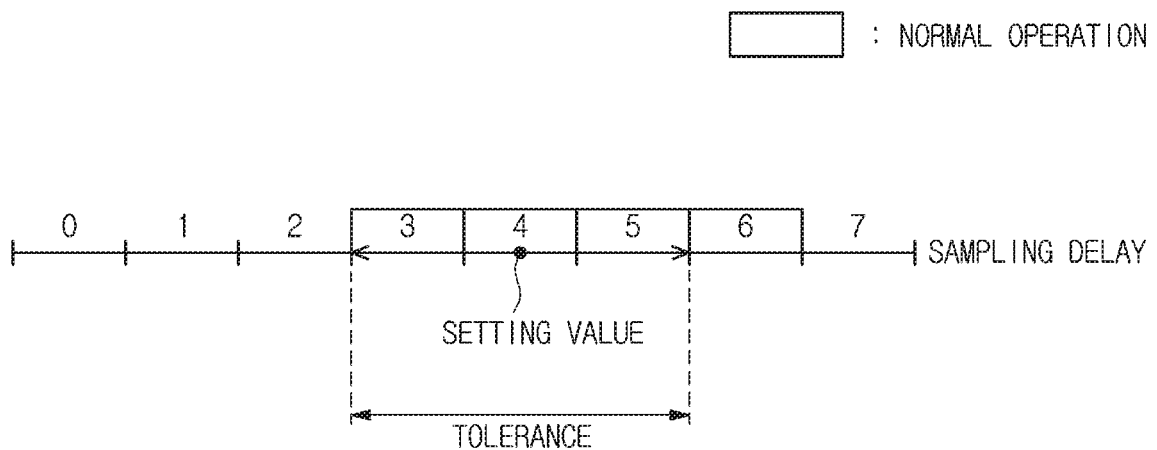
FIGS. 11 and 12 are views illustrating an example of calibration illustrated in FIG. 6.
Figure 12:
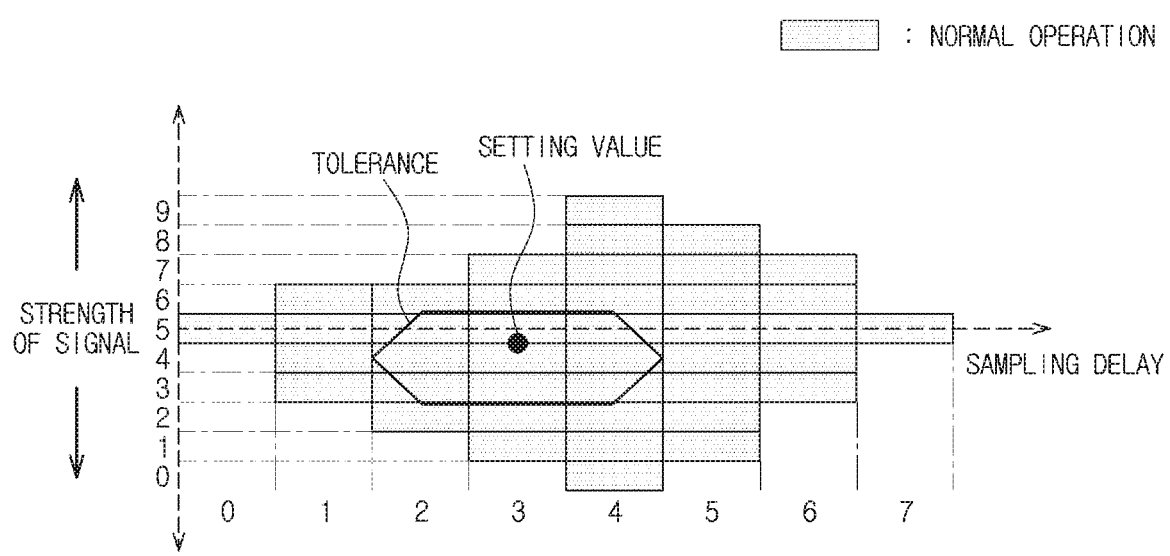

FIG. 6 is a view illustrating an error diagnosis operation of a display apparatus according to an embodiment. FIG. 7 is a view illustrating a method of determining a normal operation range of a factor value illustrated in FIG. 6. FIGS. 8, 9 and 10 are views illustrating an example of determining a normal operation range of a factor value illustrated in FIG. 6 and determining a risk of an operation error. FIGS. 11 and 12 are views illustrating an example of calibration illustrated in FIG. 6.

Referring to FIGS. 6, 7, 8A, 8B, 9, 10, 11, and 12, an error diagnosis operation 1200 of the display apparatus 100 is described.

The display apparatus 100 may initiate an error diagnosis (1210).

When the operation error of the display apparatus 100 is detected or the periodic inspection condition is satisfied, the controller 140 may perform the error diagnosis of the display apparatus 100.

For example, the controller 140 may immediately perform the error diagnosis of the display apparatus 100 when the operation error of the display apparatus 100 is detected or the periodic inspection condition is satisfied. In addition, the controller 140 may perform the error diagnosis of the display apparatus 100 when the operation error of the display apparatus 100 is detected or when the user's turn-off command is input after the periodic inspection condition is satisfied.

After initiating the error diagnosis, the display apparatus 100 determines the normal operation range of the factor value related to the operation of the display apparatus 100 (1220).

The display apparatus 100 may check the operation of each of the components included in the display apparatus 100 (e.g., user inputter, communication interface, storage, controller, image display, power supply, etc.). Particularly, the display apparatus 100 may check the operation of the display apparatus 100 by factors related to the operation of each of the components included in the display apparatus 100.

The display apparatus 100 may be controlled by various factors related to the operation. Particularly, the components included in the display apparatus 100 (e.g., user inputter, communication interface, storage, controller, image display, power supply, etc.) may be controlled by the factor related to each individual operation and factors related to associated operations with other components (e.g., communication with other components).

For example, factors related to the individual operations of the communication interface 130 may include factors related to a sampling period for sampling signals, factors related to error correction for correcting errors in signals, factors related to equalization, and the like. In addition, factors related to the associated operation of the memory 151 and the controller 140 may include factors related to a time point (sampling delay) of sampling the communication signal between the memory 151 and the controller 140, factors related to the strength of the communication signal, and the like.

The controller 140 may determine the range of factor values that allow the components included in the display apparatus 100 to operate normally. In other words, the controller 140 may determine the range of factor values for normal operation of the components included in the display apparatus 100.

Particularly, as illustrated in FIG. 7, the controller 140 may select the factor value within a range in which the factor related to the operation of the display apparatus 100 can be changed (1221).

Figure 8A:
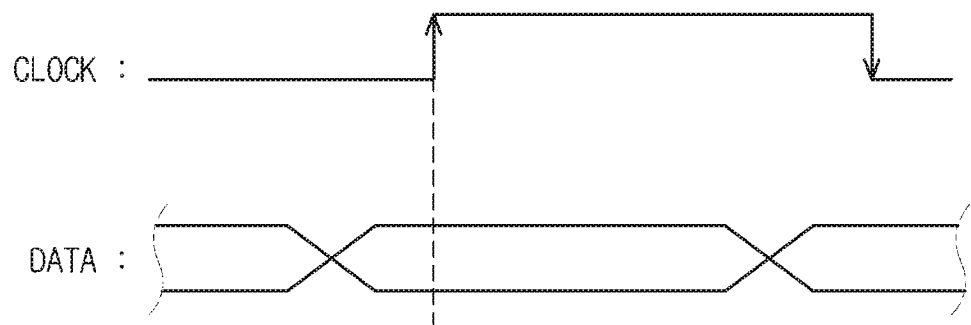
FIGS. 8A, 8B, 9 and 10 are views illustrating an example of determining a normal operation range of a factor value illustrated in FIG. 6 and determining a risk of an operation error.

For example, in relation to communication between the microprocessor 141 and the memory 151, as illustrated in FIG. 8A, the microprocessor 141 may sample data output from the memory 151 according to a clock signal.

Figure 8B:
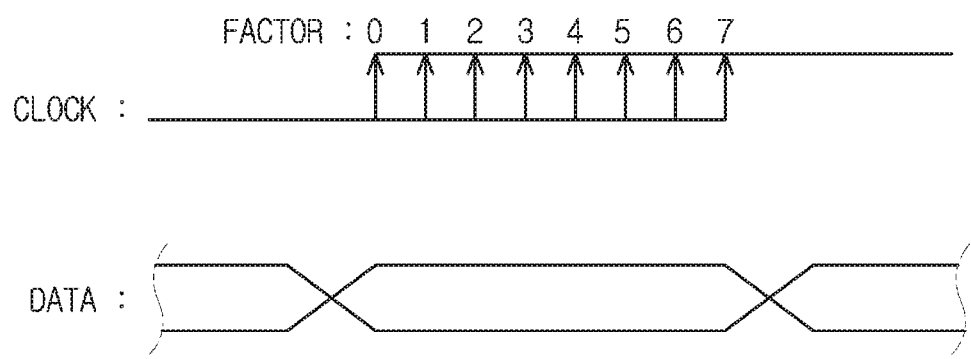

At this time, the operation at which the microprocessor 141 receives data of the memory 151 may depend on a sampling time for sampling the data of the memory 151. Also, a factor related to the sampling time at which the microprocessor 141 samples the data may be a "sampling delay." As illustrated in FIG. 8B, as a value of the sampling delay changes, the time at which the microprocessor 141 samples the data of the memory 151 may change. In addition, the value of the sampling delay may vary between "0" and "7."

In order to diagnose the operation of the display apparatus 100 due to the sampling delay, the controller 140 may select any one value between "0" and "7," which is a variation allowable range of the sampling delay.

Thereafter, the controller 140 determines whether the display apparatus 100 is operating normally (1222).

For example, the controller 140 may determine whether communication between the microprocessor 141 and the memory 151 is performed normally at the selected sampling delay value.

The sampling delay is set to "0," and the microprocessor 141 may output a command for storing predetermined reference data in the memory 151, and the memory 151 may store the reference data in response to the storage command of the microprocessor 141. Thereafter, the microprocessor 141 may output a loading command of data stored in the memory 151, and the memory 151 may transmit the reference data to the microprocessor 141 in response to the loading command of the microprocessor 141. The microprocessor 141 may compare the reference data transmitted to the memory 151 with the data received from the memory 151. When the reference data and the data of the memory 151 are the same, the microprocessor 141 may determine that the operation is normal. When the reference data and the data of the memory 151 are different, the microprocessor 141 may determine that the operation is the error.

When the display apparatus 100 operates normally (YES in 1222), the controller 140 may store the normal operation in response to the selected factor value (1223). In addition, when the display apparatus 100 does not operate normally (NO in 1222), the controller 140 may store the operation error corresponding to the selected factor value (1224).

The controller 140 may store an operation state table indicating whether the operation is normal according to the factor value, and may store data indicating the normal operation or data indicating the operation error for the selected factor value.

For example, as illustrated in FIG. 9, the controller 140 may store the data indicating the normal operation according to the normal operation of communication between the microprocessor 141 and the memory 151 with respect to the sampling delay value and the data indicating the operation error. Particularly, when the reference data transmitted to the memory 151 and the data received from the memory 151 are the same, the controller 140 may store the data indicating the normal operation. When the reference data and the data of the memory 151 are different, the controller 140 may store the data indicating the operation error.

The controller 140 may repeat determining whether the display apparatus 100 is operating normally while changing the sampling delay value.

As a result of repeatedly determining whether the display apparatus 100 is operating normally while changing the sampling delay value, the controller 140 may store the operation state table as illustrated in FIG. 9. As illustrated in FIG. 9, the data indicating the operation error may be stored corresponding to the sampling delay values "0," "1," "2," and "7," and the data indicating the normal operation may be stored corresponding to the sampling delay values "3," "4," "5," and "6."

The controller 140 is not limited to determining the normal operation range for one factor value, and the controller 140 may determine the normal operation range for two or more factor values.

For example, in relation to communication between the microprocessor 141 and the memory 151, the operation of the microprocessor 141 receiving the data of the memory 151 may be the strength of the signal output from the memory 151 (e.g., the voltage value of the signal). Also, a factor related to the strength of the signal output from the memory 151 may be a "signal strength." As the signal strength value changes, the voltage value of data output from the memory 151 may change, and the signal strength may vary between "0" and "9."

The controller 140 may diagnose the operation of the display apparatus 100 by the sampling delay and the signal strength.

The controller 140 may select any one value between "0" to "7," which is a variation allowable range of the sampling delay, and may select any one between "0" to "9," which is a variation allowable range of the signal strength.

The controller 140 may determine whether communication between the microprocessor 141 and the memory 151 is performed normally at the selected sampling delay value and signal strength value. For example, the controller 140 may select "0" and "0" for the sampling delay and the signal strength, respectively, and may determine whether communication between the microprocessor 141 and the memory 151 is performed normally.

The controller 140 may store the data indicating the normal operation or the data indicating the operation error according to the normal operation of communication between the microprocessor 141 and the memory 151 for the sampling delay value and the signal strength value.

In addition, the controller 140 may repeat determining whether the display apparatus 100 operates normally while changing the sampling delay value and the signal strength value.

As a result of repeatedly determining whether the display apparatus 100 is operating normally while changing the sampling delay value and the signal strength value, the controller 140 may store the operation state table as illustrated in FIG. 10.

After determining the normal operation range of the factor value, the display apparatus 100 may determine the risk of the operation error (1230).

The controller 140 may determine the risk of the operation error based on the normal operation range (e.g., operation state table) of the factor value and the current setting value of the factor.

The controller 140 may determine the normal operation margin of the current setting value, and may determine the risk of the operation error based on the normal operation margin of the current setting value. Particularly, the controller 140 may determine that the smaller the normal operation margin, the higher the risk of the operation error. The controller 140 may determine that the larger the normal operation margin, the lower the risk of the operation error.

The controller 140 may determine that there is the risk of the operation error when the normal operation margin is less than a reference operation margin, and may determine that there is no risk of the operation error when the normal operation margin is greater than the reference operation margin.

The reference operation margin may be set in advance by the designer of the display apparatus 100, or may be changed later by the user of the display apparatus 100. The reference operation margin may be related to reliability of a product. As the reference operation margin increases, the reliability of the product increases, and as the reference operation margin decreases, the reliability of the product decreases.

In the following, the reference operation margin is assumed to be "+1" for ease of understanding, but is not limited thereto.

The normal operation margin may indicate a range in which the display apparatus 100 can operate normally even if the factor value changes due to the operation error or the like in the current setting value. In other words, the normal operation margin may indicate a variable range of the setting value of the factor.

For example, in the communication between the microprocessor 141 and the memory 151, the current setting value of the sampling delay may be "3" as illustrated in FIG. 9.

In addition, a tolerance of the sampling delay may be "±1." The tolerance of the setting value may be determined by an international standard or a national standard or a company standard, and even if the setting value fluctuates within the tolerance, the normal operation of the product should be guaranteed. Therefore, when the setting value of the sampling delay is "3," a normal communication operation between the microprocessor 141 and the memory 151 between the sampling delay values "2" to "4" should be guaranteed.

As illustrated in FIG. 9, when the sampling delay value is "2" or less or "7" or more, the operation error occurs in communication between the microprocessor 141 and the memory 151. When the sampling delay value is between "3" and "6," the communication between the microprocessor 141 and the memory 151 may be operated normally. Therefore, the normal operation margin of the sampling delay may be "−1" in a negative direction and "+2" in a positive direction.

As described above, since the normal operation margin "−1" in the negative direction of the sampling delay is less than the reference operation margin "+1," the controller 140 may determine that there is the risk of the error. In particular, since the normal operation margin of the sampling delay is less than "0," the operation error may occur even in the current setting value.

As another example, in the communication between the microprocessor 141 and the memory 151 as illustrated in FIG. 10, the current setting values of the sampling delay and the signal strength may be "3" and "5," respectively.

In addition, the tolerance of the sampling delay is "±1," and the tolerance of the signal strength may be "±1."

As illustrated in FIG. 10, even if the sampling delay is changed, the communication between the microprocessor 141 and the memory 151 may operate normally. Therefore, the normal operation margin of the sampling delay may be "+2" in the negative direction and "+3" in the positive direction.

On the other hand, when the signal strength value is "1" or less or "7" or more, the operation error occurs in communication between the microprocessor 141 and the memory 151. When the signal strength value is between "2" and "6," the communication between the microprocessor 141 and the memory 151 may operate normally. Therefore, the normal operation margin of the signal strength may be "+2" in the negative direction and "0" in the positive direction.

As such, the normal operation margin of the sampling delay is greater than the reference operation margin "+1," but the normal operation margin "0" in the positive direction of the signal strength is less than the reference operation margin "+1," so the controller 140 may determine that there is the risk of the operation error.

When the risk of the operation error is not determined (NO in 1230), the display apparatus 100 may perform the error monitoring operation 1100 (1280).

When the risk of the operation error is not determined as the result of error diagnosis, the controller 140 may terminate the error diagnosis and perform error monitoring.

When the risk of the operation error is determined (YES in 1230), the display apparatus 100 may perform the calibration to resolve the operation error (1240).

The controller 140 may perform the calibration to change the setting value of factor to solve the risk of the operation error. Particularly, the controller 140 may change the setting value of the factor so that the normal operation margin of the factor increases while performing the calibration.

For example, in the communication between the microprocessor 141 and the memory 151, the normal operation margin of the sampling delay may be "−1" in the negative direction and "+2" in the positive direction. Since the normal operation margin "−1" in the negative direction of the sampling delay is less than the reference operation margin "1," the controller 140 may determine that there is the risk of the operation error.

The controller 140 may change the setting value of the sampling delay so that the normal operation margin of the sampling delay increases. Since the normal operation margin in the negative direction of the sampling delay is less than the reference operation margin, if the current setting value is increased to "1," the controller 140 may increase the normal operation margin in the negative direction.

The controller 140 may change the setting value of the sampling delay from "3" to "4" as illustrated in FIG. 11 during a calibration operation. By changing the setting value of the sampling delay, the normal operation margin of the sampling delay may be "0" in the negative direction and "+1" in the positive direction.

As another example, in the communication between the microprocessor 141 and the memory 151, the normal operation margin of the sampling delay may be "+2" in the negative direction and "+3" in the positive direction, and the normal operation margin of the signal strength may be "+2" in the negative direction and "0" in the positive direction. In the positive direction of the signal strength, since the normal operation margin "0" is less than the reference operation margin "1," the controller 140 may determine that there is the risk of the operation error.

The controller 140 may change the setting value of the signal strength so that the normal operation margin of the signal strength increases. Since the normal operation margin in the positive direction of the signal strength is less than the reference operation margin, if the current setting value is decreased to "1," the controller 140 may increase the normal operation margin in the positive direction.

The controller 140 may change the setting value of the signal strength from "5" to "4" as illustrated in FIG. 12 during the calibration operation. By changing the setting value of the signal strength, the normal operation margin of the signal strength may be "+1" in the negative direction and "+1" in the positive direction.

After performing the calibration, the display apparatus 100 may determine the risk of the operation error again (1250).

The controller 140 may determine the risk of the operation error based on the normal operation range (e.g., operation state table) of the factor value and the changed setting value of the factor. Particularly, the controller 140 may determine the normal operation margin of the current setting value, and may determine the risk of the operation error based on the normal operation margin of the current setting value.

For example, as illustrated in FIG. 11, the changed setting value of the sampling delay may be "4," and the normal operation margin of the sampling delay may be "0" in the negative direction and "+1" in the positive direction.

The normal operation margin "0" in the negative direction of the sampling delay is less than the reference operation margin "+1," so the controller 140 may determine that there is the risk of the error.

As another example, as illustrated in FIG. 12, the changed setting value of the signal strength may be "4," and the normal operation margin of the signal strength may be "+1" in the negative direction and "+1" in the positive direction.

Since the normal operation margin of the signal strength is not less than the reference operation margin "+1" (because it is greater than or equal to), the controller 140 may determine that the risk of error is low or absent.

When the risk of the operation error is not determined (NO in 1250), the display apparatus 100 may perform the error monitoring operation 1100 (1280).

When the risk of the operation error is resolved by the calibration, the controller 140 may terminate the error diagnosis and perform the error monitoring.

For example, as illustrated in FIG. 12, when the normal operation margin of the signal strength is greater than or equal to the reference operation margin by the calibration, the controller 140 may terminate the error diagnosis and perform the error monitoring.

When the risk of the operation error is determined (YES in 1250), the display apparatus 100 may determine whether the number of times the calibration is performed is greater than a reference number (1260).

When the risk of the operation error is not resolved by the calibration, the controller 140 may continue to perform the calibration. Accordingly, in order to limit the number of times the calibration is performed, the controller 140 may compare the number of the calibration is performed with the reference number, and may determine whether the number of the calibration is performed is greater than the reference number.

The reference number may be set in advance by the designer of the display apparatus 100, or may be changed later by the user of the display apparatus 100. The reference number may be related to the number of times of performing the error diagnosis. As the reference number increases, the number of times of performing the error diagnosis may increase. For example, the number of the calibration is performed may be set to 3 or less.

When the number of the calibration is performed is not greater than the reference number (NO in 1260), the display apparatus 100 may perform the calibration to resolve the operation error (1240).

When the risk of the operation error is not resolved by the calibration, the controller 140 may continue to perform the calibration.

For example, as illustrated in FIG. 11, when the normal operation margin in the negative direction of the sampling delay is still smaller than the reference operation margin by the calibration, the controller 140 may perform the calibration again.

Since the normal operation margin in the negative direction of the sampling delay is smaller than the reference operation margin, increasing the current setting value to "1" may increase the normal operation margin in the negative direction.

The controller 140 may change the setting value of the sampling delay from "4" to "5" during a second calibration operation. By changing the setting value of the sampling delay, the normal operation margin of the sampling delay may be "+1" in the negative direction and "0" in the positive direction.

By the second calibration operation, the normal operation margin in the negative direction of the sampling delay is equal to the reference operation margin "1," but the normal operation margin in the positive direction of the sampling delay is smaller than the reference operation margin "1." Therefore, the risk of the operation error is still not resolved, and the controller 140 may repeat the calibration operation.

When the number of the calibration is performed is greater than the reference number (YES in 1260), the display apparatus 100 may transmit the diagnostic data of the error diagnosis operation to the service apparatus 2 (1270).

When the number of performing the calibration operation is greater than the reference number while repeating the calibration operation, the controller 140 may transmit the diagnostic data of the error diagnosis operation to the service apparatus 2 and terminate the error diagnosis.

When the risk of the operation error is not resolved by calibration several times, the controller 140 may determine that the risk of the operation error is not resolved by the calibration operation.

For this reason, the controller 140 may transmit the diagnostic data of the error diagnosis operation to the service apparatus 2 through the communication interface 130, and the service apparatus 2 may provide a service for resolving the risk of the operation error in response to reception of the diagnostic data of the display apparatus 100.

The diagnostic data may include all data related to the operation errors and the error diagnosis of the display apparatus 100. The diagnostic data includes, for example, environmental data when the operation error occurs (e.g., data of the content source connected to the display apparatus), the factor that causes the operation error, the range of the factor value that causes the display apparatus to operate normally, the current setting value of the factor that causes the operation error, and the normal operation margin of the factor that causes the operation error.

The service apparatus 2 may analyze the diagnostic data of the display apparatus 100 and provide the service for resolving the operation error or the risk of the operation error according to the analysis result.

As described above, the display apparatus 100 may determine the risk of the operation error of the display apparatus 100 based on the normal operation margin of factors related to the operation of the display apparatus 100. When the risk of the operation error is detected, the display apparatus 100 may perform the calibration that changes the setting value of factor. In addition, when the risk of the operation error is not resolved by the calibration, the display apparatus 100 may transmit the diagnostic data to the service apparatus 2.

As a result, the display apparatus 100 may determine the risk of the operation error by itself, and when the risk of the operation error is detected, the risk of the operation error may be resolved without the user's inconvenience.

Figure 13:
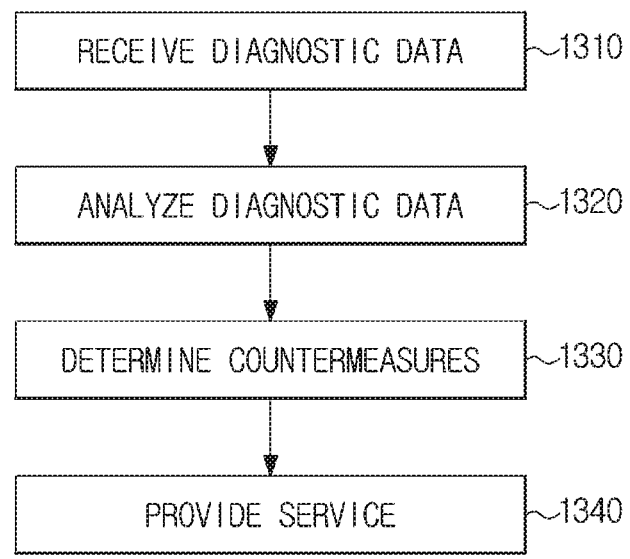
FIG. 13 is a view illustrating a service providing operation of a service apparatus according to an embodiment.

FIG. 13 is a view illustrating a service providing operation of a service apparatus according to an embodiment.

Referring to FIG. 13, a service providing operation 1300 of the service apparatus 2 is described.

The service apparatus 2 may receive the diagnostic data from the display apparatus 100 (1310).

The service apparatus 2 may be operated by the producer or the seller or the service agent of the display apparatus 100, and may operate as a kind of cloud server.

The service apparatus 2 may receive the diagnostic data from the display apparatus 100 to provide the service for the display apparatus 100 to the user.

The diagnostic data may include all data related to the operation errors and the error diagnosis of the display apparatus 100. The diagnostic data includes, for example, environmental data when the operation error occurs (e.g., data of the content source connected to the display apparatus), the factor that causes the operation error, the range of the factor value that causes the display apparatus to operate normally, the current setting value of the factor that causes the operation error, and the normal operation margin of the factor that causes the operation error.

The service apparatus 2 may analyze the diagnostic data received from the display apparatus 100 (1320).

The service apparatus 2 may collect the diagnostic data from a plurality of the display apparatuses. In other words, the service apparatus 2 may receive the diagnostic data on operation errors from various apparatuses other than the display apparatus 100, and may store the received diagnostic data and data on countermeasures corresponding to the operation error in a database.

The service apparatus 2 may analyze the diagnostic data of the display apparatus 100 using the database including the diagnostic data and the data related to the countermeasures.

The service apparatus 2 may compare the diagnostic data of the database with the diagnostic data of the display apparatus 100, and may determine countermeasures included in the database according to the comparison result.

When the diagnostic data of the display apparatus 100 is matched with the diagnostic data of the database, the service apparatus 2 may determine countermeasures corresponding to the diagnostic data of the display apparatus 100 based on data related to the countermeasures included in the database. In addition, when the diagnostic data of the display apparatus 100 does not match the diagnostic data of the database, the service apparatus 2 may add the diagnostic data of the display apparatus 100 to the database and request countermeasures from the designer of the display apparatus 100.

The service apparatus 2 may determine countermeasures corresponding to the diagnostic data of the display apparatus 100 (1330).

After analyzing the diagnostic data of the display apparatus 100, the service apparatus 2 may determine countermeasures corresponding to the diagnostic data of the display apparatus 100.

As described above, the service apparatus 2 may compare the diagnostic data of the database with the diagnostic data of the display apparatus 100, and may determine countermeasures included in the database according to the comparison result. The countermeasures may include, for example, a visit by the service representative, guidance of user actions to resolve the operation error, or receipt of a service for repairing the display apparatus 100.

The service apparatus 2 may provide the service for countermeasures (1330).

After determining the countermeasures, the service apparatus 2 may provide the service for the countermeasures to the user.

For example, the service apparatus 2 may call the service representative so that the service representative of the display apparatus 100 visits the user.

As another example, the service apparatus 2 may transmit a message including the user action to the display apparatus 100 so that the user action that can be performed by the user is displayed in order to solve the operation error of the display apparatus 100.

As another example, the service apparatus 2 may transmit the service receipt guide message to the display apparatus 100 so that the guide message for receiving the display apparatus 100 in the service center is displayed.

As described above, the service apparatus 2 may collect the diagnostic data related to the operation error from the display apparatus 100 and analyze the diagnostic data of the display apparatus 100. The display apparatus 100 may determine countermeasures and provide the service for the countermeasures according to the analysis result of the diagnostic data.

As a result, the display apparatus 100 and the service apparatus 2 may provide an accurate diagnosis and proper service related to the operation error to the user, and may prevent an unnecessary visit from the service representative.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Embodiments and examples of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A display apparatus comprising:
a display;
a content receiver configured to receive image content;
a communication interface configured to communicate with a service apparatus;
a storage configured to store setting values of factors related to respective operations of the content receiver, the communication interface, and the display; and
a controller configured to:
change a setting value of a factor related to operation of at least one of the content receiver, the communication interface, or the display,
determine whether risk of operation error of the at least one of the content receiver, the communication interface, or the display is caused due to the changed setting value,
determine a normal operation range of the factor that causes the at least one of the content receiver, the communication interface, or the display to operate normally while changing a value of the factor, and
determine whether there is risk of operation error of the at least one of the content receiver, the communication interface, or the display by the setting value of the factor, based on the normal operation range of the factor and the setting value of the factor,
wherein the controller is configured to, based on determining that there is a risk of operation error of the at least one of the content receiver, the communication interface, or the display by the changed setting value, transmit information about the factor and the operation error to the service apparatus through the communication interface.

2. The display apparatus according to claim 1, wherein:
the controller is configured to, based on detecting operation error of the at least one of the content receiver, the communication interface, or the display, determine whether the content receiver, the communication interface, and the display are at risk of operation error.

3. The display apparatus according to claim 1, wherein:
the controller is configured to, based on an operation time of the display apparatus being greater than a reference time, determine whether the content receiver, the communication interface, and the display are at risk of operation error.

4. The display apparatus according to claim 3, wherein:
the controller is configured to, based on an operation time of the display apparatus being greater than the reference time, determine whether the content receiver, the communication interface, and the display are at risk of operation error after a turn-off command is received.

5. The display apparatus according to claim 1, wherein:
the controller is configured to, based on the setting value of the factor being outside the normal operation range of the factor, determine that there is operation error of the at least one of the content receiver, the communication interface, or the display.

6. The display apparatus according to claim 1, wherein:
the controller is configured to determine a normal operation margin of the factor, based on a difference between the setting value of the factor and an upper limit of the normal operation range of the factor and a difference between the setting value of the factor and a lower limit of the normal operation range of the factor, and to determine that there is risk of operation error of the at least one of the content receiver, the communication interface, or the display based on the normal operation margin of the factor being less than a reference operation margin.

7. The display apparatus according to claim 6, wherein:
the controller is configured to change the setting value of the factor to increase the normal operation margin of the factor based on the normal operation margin of the factor being less than the reference operation margin.

8. The display apparatus according to claim 7, wherein:
the controller is configured to, based on not determining that there is risk of operation error of the at least one of the content receiver, the communication interface, or the display by the changed setting value, store the changed setting value in the storage.

9. A method of controlling a display apparatus, the display apparatus including a display, a content receiver, and a communication interface, the method comprising:
storing, by a storage, setting values of factors related to respective operations of the content receiver, the communication interface, and the display;
determining, by a controller, whether at least one of the content receiver, the communication interface, or the display are at a risk of operation error;
when it is determined that there is risk of operation error of the at least one of the content receiver, the communication interface, or the display, determining, by the controller, whether risk of operation error is caused by a setting value while changing the setting value of a factor related to operation of the at least one of the content receiver, the communication interface, or the display; and
when it is determined that there is risk of operation error caused due to the changed setting value, transmitting, by the controller, information about the factor and the operation error to a service apparatus through the communication interface,
wherein the determining of whether the at least one of the content receiver, the communication interface, or the display are at risk of operation error comprises:
determining a normal operation range of the factor that causes the at least one of the content receiver, the communication interface, or the display to operate normally while changing a value of the factor, and
determining whether there is risk of operation error of the at least one of the content receiver, the communication interface, and the display by the setting value of the factor, based on the normal operation range of the factor and the setting value of the factor.

10. The method according to claim 9, further comprising:
based on detecting operation error of the at least one of the content receiver, the communication interface, and the display, determining, by the controller, whether the content receiver, the communication interface, and the display are at risk of operation error.

11. The method according to claim 9, further comprising:
based on an operation time of the display apparatus being greater than a reference time, determining, by the controller, whether the content receiver, the communication interface, and the display are at risk of operation error after a turn-off command is received from a user.

12. The method according to claim 9, wherein the determining of whether the at least one of the content receiver, the communication interface, or the display are at risk of operation error comprises:
determining a normal operation margin of the factor, based on a difference between the setting value of the factor and an upper limit of the normal operation range of the factor and a difference between the setting value of the factor and a lower limit of the normal operation range of the factor; and
determining that there is risk of operation error of the at least one of the content receiver, the communication interface, or the display based on the normal operation margin of the factor being less than a reference operation margin.

13. The method according to claim 12, further comprising:
changing, by the controller, the setting value of the factor to increase the normal operation margin of the factor based on the normal operation margin of the factor being less than the reference operation margin.

14. The method according to claim 13, further comprising:
based on not determining that there is risk of operation error of the at least one of the content receiver, the communication interface, or the display by the changed setting value, storing, by the controller, the changed setting value in the storage.

* * * * *